United States Patent
Bobert

(10) Patent No.: US 9,627,859 B2
(45) Date of Patent: Apr. 18, 2017

(54) SPARK GAP ARRANGEMENT

(71) Applicant: EPCOS AG, München (DE)

(72) Inventor: Peter Bobert, Falkensee (DE)

(73) Assignee: EPCOS AG, Munich (DE)

( * ) Notice: Subject to any disclaimer, the term of this patent is extended or adjusted under 35 U.S.C. 154(b) by 435 days.

(21) Appl. No.: 14/381,559

(22) PCT Filed: Feb. 26, 2013

(86) PCT No.: PCT/EP2013/053814
§ 371 (c)(1),
(2) Date: Aug. 27, 2014

(87) PCT Pub. No.: WO2013/127788
PCT Pub. Date: Sep. 6, 2013

(65) Prior Publication Data
US 2015/0130362 A1 May 14, 2015

(30) Foreign Application Priority Data
Feb. 27, 2012 (DE) .......................... 10 2012 101 558

(51) Int. Cl.
H01T 15/00 (2006.01)
H01T 2/02 (2006.01)
(Continued)

(52) U.S. Cl.
CPC ............... *H01T 15/00* (2013.01); *H01T 2/00* (2013.01); *H01T 2/02* (2013.01); *H02H 9/06* (2013.01)

(58) Field of Classification Search
CPC .. H01T 2/00–2/02; H01T 14/00; H01T 15/00; H02H 9/06
See application file for complete search history.

(56) References Cited

U.S. PATENT DOCUMENTS 3,869,645 A   3/1975 Collins
3,949,273 A * 4/1976 Santo ...................... H01T 15/00
                                                          361/256
(Continued)

FOREIGN PATENT DOCUMENTS

DE      2628209 A1   1/1977
DE     10048053 A1   6/2002
(Continued)

*Primary Examiner* — Stephen W Jackson
*Assistant Examiner* — Christopher Clark
(74) *Attorney, Agent, or Firm* — McDermott Will & Emery LLP

(57) ABSTRACT

A spark gap arrangement comprises a triggerable spark gap (TF) and a trigger circuit (TRG), which comprises a first and a second charge store (C1, C2), a first resistor (R1), a triggerable dissipation element (SF, SF3, TD, TH) and a transformer (T1). The trigger circuit is set up to intermediately store the energy of an input pulse supplied to the input side of the trigger circuit (TRG), wherein storage takes place at least by means of the first charge store (C1). A part of the stored energy is transferred to the second charge store (C2) via the first resistor (R1). The triggerable dissipation element (SF, TD, TH) is set up to turn on on the basis of a voltage across the second charge store (C2) and to discharge the first charge store (C1) via a primary side (T11) of the transformer (T1). In this case, a secondary side (T12) of the transformer (T1) is connected to a main electrode (HE) of the triggerable spark gap (TF) and to a trigger electrode (TE) of the triggerable spark gap (TF).

15 Claims, 3 Drawing Sheets

Figure 1:
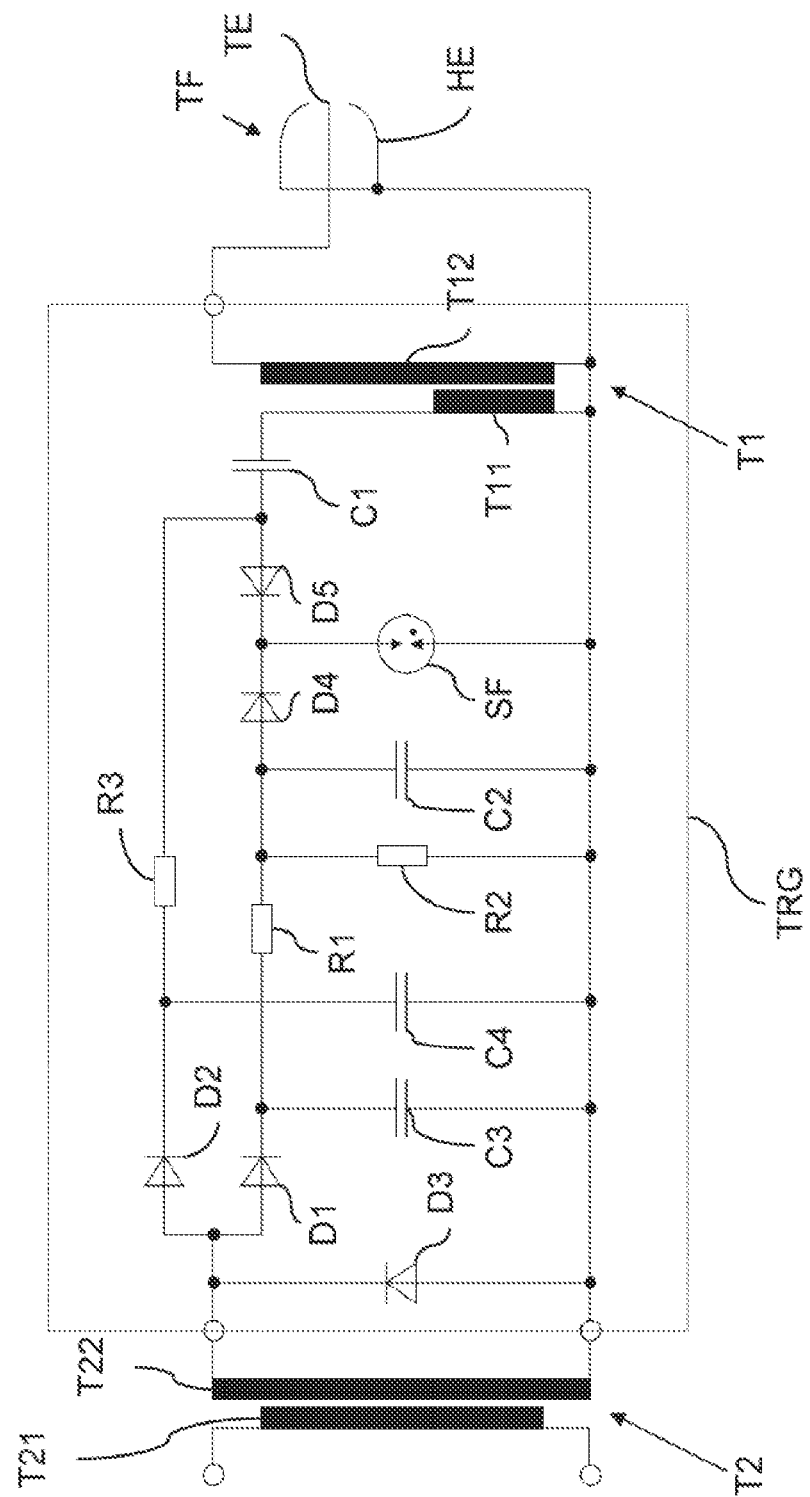

(51) Int. Cl.
*H02H 9/06* (2006.01)
*H01T 2/00* (2006.01)

(56) References Cited

U.S. PATENT DOCUMENTS

| | | | | |
|---|---|---|---|---|
| 4,631,453 A | * | 12/1986 | DeSouza | H01T 2/02 |
| | | | | 313/268 |
| 6,111,740 A | * | 8/2000 | Danowsky | H01T 2/02 |
| | | | | 361/111 |
| 2009/0154044 A1 | * | 6/2009 | Crevenat | H02H 9/06 |
| | | | | 361/91.1 |
| 2009/0213504 A1 | * | 8/2009 | Hallstrom | H01T 15/00 |
| | | | | 361/16 |
| 2010/0290169 A1 | * | 11/2010 | Salovaara | H02G 13/00 |
| | | | | 361/120 |

FOREIGN PATENT DOCUMENTS

| | | | |
|---|---|---|---|
| FR | 2317804 | A1 | 2/1977 |
| JP | S524379 | A | 1/1977 |
| JP | S55105119 | A | 8/1980 |
| JP | S55146327 | A | 11/1980 |
| JP | S5758016 | A | 4/1982 |

* cited by examiner

SPARK GAP ARRANGEMENT

The invention relates to a spark gap arrangement having a triggerable spark gap.

Conventional triggerable spark gaps usually have at least two main electrodes and one trigger electrode. By way of example, the electrodes are arranged in a gas-filled space, wherein, by applying an appropriate trigger voltage to the trigger electrode, a spark gap between the trigger electrode and one of the main electrodes is ignited. By way of example, in this case, an ionized arc gap occurs in the gas-filled space, across which arc gap a current flows between the trigger electrode and the one main electrode. Owing to the ignition by means of the trigger electrode, a further conducting channel between the two main electrodes is then formed, with the result that a flow of current is possible between the main electrodes.

Triggerable spark gaps such as this can be used, for example, as surge arresters. Another possible application consists, for example, in the targeted turning-on of high voltages.

In the case of conventional triggerable spark gaps, the connection between the main electrodes is directly triggered with the application of the trigger pulse at the trigger electrode.

A problem to be solved consists in specifying a spark gap arrangement having a triggerable spark gap, in which the triggerable spark gap is triggered with a predefined delay, in particular a tamper-proof delay.

This problem is solved by means of the subject matter of the independent patent claim. Developments and embodiments are the subject matter of the dependent claims.

By way of example, for this purpose, a trigger circuit is provided in the spark gap arrangement, which trigger circuit uses a pulse present on the input side in a delayed form to actuate the triggerable spark gap. For this purpose, for example, energy of the pulse present on the input side is intermediately stored on at least one store. The intermediately stored energy is transferred to another store with a predefined time constant. If a certain state of charge is achieved during the transfer process with the time constant to the further store, said state of charge triggers the turning-on or discharging of the at least one store, wherein said discharging takes place in a pulsed manner. Said discharge pulse is conducted to the trigger electrode of the triggerable spark gap, for example by means of a transformer, in order to cause said triggerable spark gap to trigger in an appropriately time-delayed manner. By way of example, the trigger circuit is integrated in a housing of the triggerable spark gap. In addition, for example, contact cannot be made with the trigger connection of the triggerable spark gap from the outside, with the result that triggering is only possible via the trigger circuit in a delayed manner.

In one embodiment, the trigger circuit comprises a first and a second charge store, a first resistor, a triggerable dissipation element and a transformer. In this case, the trigger circuit is set up to intermediately store the energy of an input pulse supplied to the input side of the trigger circuit, wherein storage takes place at least by means of the first charge store. In addition, the trigger circuit is set up to transfer a part of the stored energy to the second charge store via the first resistor. The triggerable dissipation element is set up to turn on on the basis of a voltage across the second charge store and to discharge the first charge store via a primary side of the transformer. A secondary side of the transformer is connected to a main electrode of the triggerable spark gap and to a trigger electrode of the triggerable spark gap.

The triggerable dissipation element, which is formed, for example, by a switching spark gap, a three-electrode arrester or a thyristor with trigger diode, has, for example, a corresponding turn-on voltage and turns on when the voltage across the second charge store reaches said turn-on voltage. The pulse present on the input side is correspondingly used to charge the first charge store, wherein the charging takes place directly or indirectly, by means of intermediate storage in a further charge store. The energy of the pulse is thus intermediately stored in the trigger circuit after the input pulse has decayed and is used in order to charge the second charge store, wherein a time constant results from the discharge of the intermediate store via the resistor. The voltage across the second charge store increases with the corresponding time constant until the turn-on voltage is reached. When the triggerable dissipation element is turned on, the first charge store is bypassed in a low-impedance manner, wherein the first charge store is, for example, connected in series with a primary winding of the transformer. Accordingly, a pulse is induced in the transformer by the discharge of the first charge store, which pulse ultimately effects the triggering of the triggerable spark gap.

In various embodiments, another resistor is connected in parallel with the second charge store. As a result of this, the second charge store can be regularly discharged during operation of the arrangement, with the result that no precharging is present on the second charge store when an input pulse occurs. As a result, it is additionally prevented that a voltage across the second charge store reaches the turn-on voltage of the triggerable dissipation element faster than is provided or envisioned owing to the dimensioning, in particular, of the first resistor and the second charge store. The further resistor is preferably dimensioned such that, when the energy is transferred to the second charge store, only low currents occur through the further resistor and the energy which is intermediately stored as charge can be transferred to the second charge store.

In various other embodiments, the trigger circuit has a rectifier circuit which is set up to enable the storage of the energy of the input pulse on the basis of a positive half-cycle and/or a negative half-cycle of the input pulse. Correspondingly, the rectifier can be designed both as a half-wave rectifier which only allows through one half-cycle of the input pulse and short-circuits the other half-cycle, but also as a full-wave rectifier which makes both the positive and the negative half-cycle of an input pulse available for storing the energy.

In various embodiments, the transformer is embodied as a high-voltage transformer. By way of example, the charge stores are charged by means of the input pulse to a higher voltage level, for example in the region of 400 V, which is stepped up by the high-voltage transformer to a trigger voltage in the region of 10 kV for the triggerable spark gap.

In other embodiments, the spark gap arrangement also comprises a further transformer which is set up to generate the input pulse from a pulse present at a primary side of the further transformer. By way of example, the trigger circuit is connected to the secondary side of the further transformer for this purpose. In this embodiment, a pulse can be applied to the primary side of the further transformer, which pulse is retransformed via the further transformer to form the input pulse.

In various embodiments, the triggerable spark gap is a gas-discharge spark gap or a gas-filled electrical surge arrester.

As mentioned above, a temporal behavior of the trigger circuit can be predefined by the dimensioning of the components of the trigger circuit, in particular by the specific configuration of the time constants. By way of example, the trigger circuit is correspondingly dimensioned such that a time interval between the appearance of the input pulse and the turning-on of the switching spark gap is always greater than a predefined value, in particular is greater than 15 μs. Accordingly, a tamper-proof spark gap arrangement can be provided.

In a particular embodiment of the spark gap arrangement, the storage of the energy of the input pulse takes place exclusively by means of the first charge store. In this case, the trigger circuit is set up to partially discharge the first charge store via the first resistor in order to charge the second charge store. In particular, in this connection, the first charge store is directly charged by the input pulse, that is to say the current generated by the input pulse or the corresponding voltage is directly used to charge the first charge store.

Once the input pulse has decayed, a voltage is therefore present across the first charge store. Part of the stored energy from the first charge store is transferred via the first resistor to the second charge store such that the voltage across the second charge store increases according to the resulting time constant. The first and the second charge stores are in this case preferably dimensioned in a manner matched to one another such that the voltage across the first charge store drops only slightly owing to the transfer of energy from the first charge store to the second charge store, with the result that a sufficient voltage is present during the turning-on of the dissipation element, which enables the triggerable spark gap to be triggered. By way of example, the first charge store has a 50 to 100 times greater capacitance than the second charge store.

By way of example, the triggerable dissipation element in this embodiment has a trigger diode and a thyristor, wherein the trigger diode is set up to switch the thyristor so as to conduct on the basis of the voltage across the second charge store. If, therefore, the voltage across the second charge store reaches the turn-on voltage, the trigger diode is transferred into a conducting state, with the result that a control current is conducted to the control electrode of the thyristor in order to trigger same or to switch it so as to conduct. In this case, the thyristor is interconnected with the first charge store such that a discharge takes place via the primary side of the transformer.

In another particular embodiment, the trigger circuit also comprises a third charge store. In this case, the storage of the energy of the input pulse takes place via the first charge store and the third charge store. In this case, the trigger circuit is preferably set up to charge the first charge store and the third charge store directly by means of the input pulse, that is to say to use the current or the voltage which results from the input pulse to charge the first and the third charge stores. In this embodiment, the trigger circuit is set up to discharge the third charge store via the first resistor in order to charge the second charge store.

The energy of the input pulse is thus stored in the first and third charge stores, wherein the energy stored in the first charge store is used for the discharge via the dissipation element, while the energy on the third charge store is used to charge the second charge store with the corresponding time constant and thus to allow the voltage across the second charge store to rise.

By way of example, this embodiment of the trigger circuit is set up to charge the first and the third charge stores via a diode which is respectively connected in series with the first and the third charge store. In this case, a cathode of the respective diode is preferably connected to the charge store. As a result, a transfer of charge between the first and third charge store is prevented. By way of example, the first and the third charge stores are dimensioned such that the first charge store has a significantly greater capacitance value than the third charge store, for example by a factor of 100 to 500 times greater.

In this embodiment, the triggerable dissipation element comprises, for example, a three-electrode arrester, in which a central electrode is set up to turn on the three-electrode arrester on the basis of the voltage across the second charge store. The turn-on voltage of the dissipation element is thus determined via the predefined switching voltage of the three-electrode arrester between the outer electrode which is connected to the second charge store and the central electrode. The first charge store is connected, for example, to the other outer electrode, with the result that, when the arc gap between the second charge store and the central electrode is ignited, the entire three-electrode arrester becomes conductive and a current path is formed for the first charge store via the central electrode and the primary side of the transformer.

In another particular embodiment, the trigger circuit also has a third and a fourth charge store and a second resistor, wherein the storage of the energy of the input pulse takes place directly by means of the third and the fourth charge stores. The trigger circuit is set up to discharge the third charge store via the first resistor in order to charge the second charge store, and to discharge the fourth charge store via the second resistor in order to charge the first charge store. Correspondingly, the energy of the input pulse is stored in the first charge store and the third charge store in this embodiment, too.

However, in this embodiment, the pulse present on the input side is used to directly charge the third and the fourth charge stores, with the result that a certain voltage is present across the third or fourth charge store once the input pulse has decayed. Said voltages are discharged via the first or second resistor to the first or second charge store, wherein respective time constants result from the discharge via the resistors, in a similar manner to that described above. In this connection, the first charge store is preferably charged to a maximum voltage which is below the turn-on voltage of the triggerable dissipation element. In this embodiment, the triggerable dissipation element is embodied as a switching spark gap which is set up to turn on on the basis of the voltage across the second charge store. Said voltage across the second charge store increases with the corresponding time constant until the turn-on voltage is reached. When the dissipation element is turned on, the first and the second charge stores are bypassed in a low-impedance manner. Accordingly, a pulse is induced in the transformer through the discharge of the first charge store, which pulse ultimately effects the triggering of the triggerable spark gap.

By way of example, the fourth charge store has a greater capacitance than the third charge store. In addition, the first charge store has, for example, a greater capacitance than the second charge store. Therefore, greater amounts of charge can be stored on the fourth or first charge store than on the second or third charge store. The smaller charge stores are used, for example, to realize the time delay, while the larger charge stores are used to generate the pulse which leads to the triggerable spark gap being triggered. By way of example, the capacitance of the fourth charge store is greater than that of the third charge store by a factor of between 5 and 20, in particular around 10. Similarly, the capacitance of the first charge store is, for example, greater than that of the second charge store by a factor of between 30 and 70, in particular around 50. The resistance values of the first resistor and the second resistor can be different from one another, too. By way of example, a resistance value of the first resistor is greater than a resistance value of the second resistor, in particular by a factor of between 30 and 70, for example around 50.

The invention is explained in more detail below on the basis of a plurality of exemplary embodiments with reference to figures. In this connection, identical reference signs denote elements or components having the same function. Insofar as elements or components correspond in terms of their function, the description thereof will not be repeated in each of the following figures.

Figure 2:
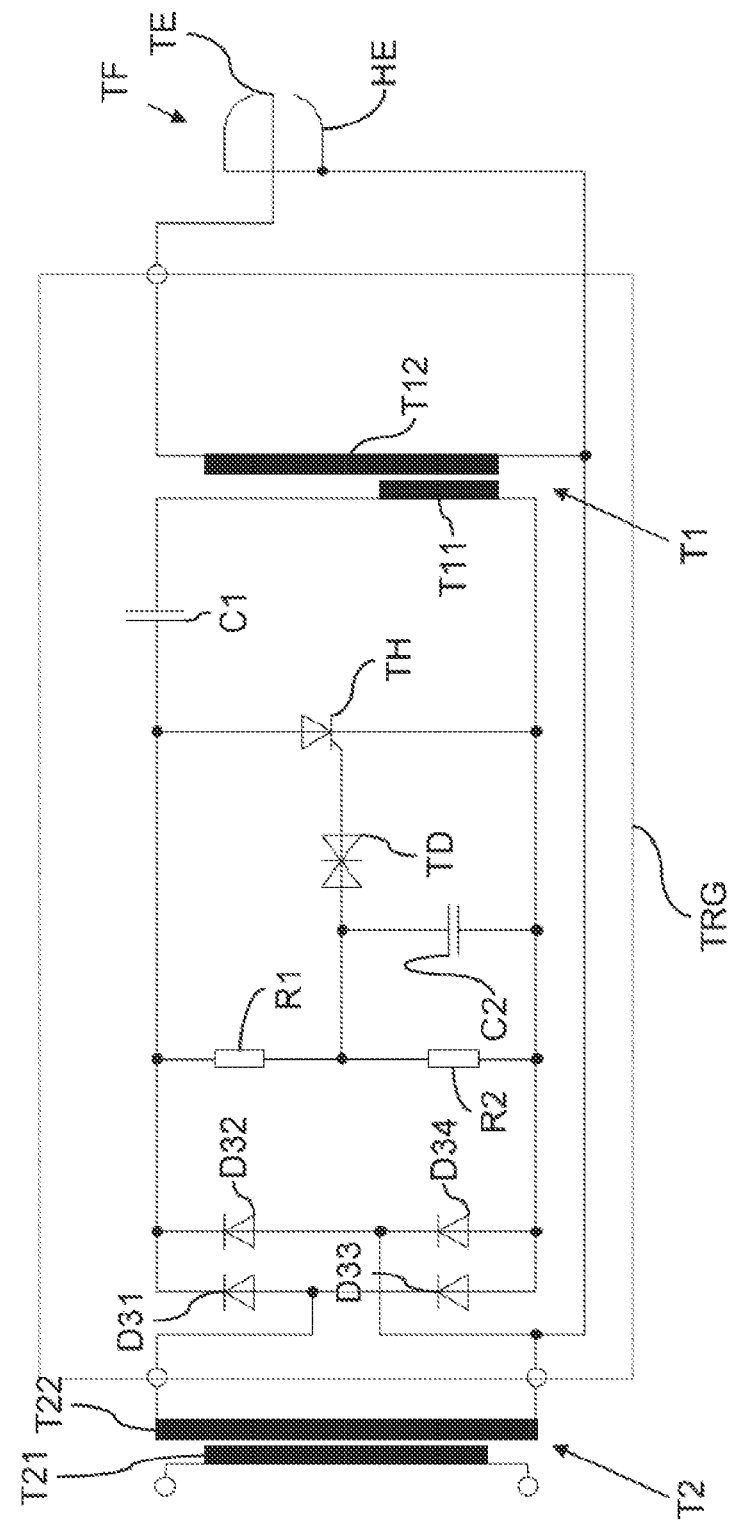
Figure 3:
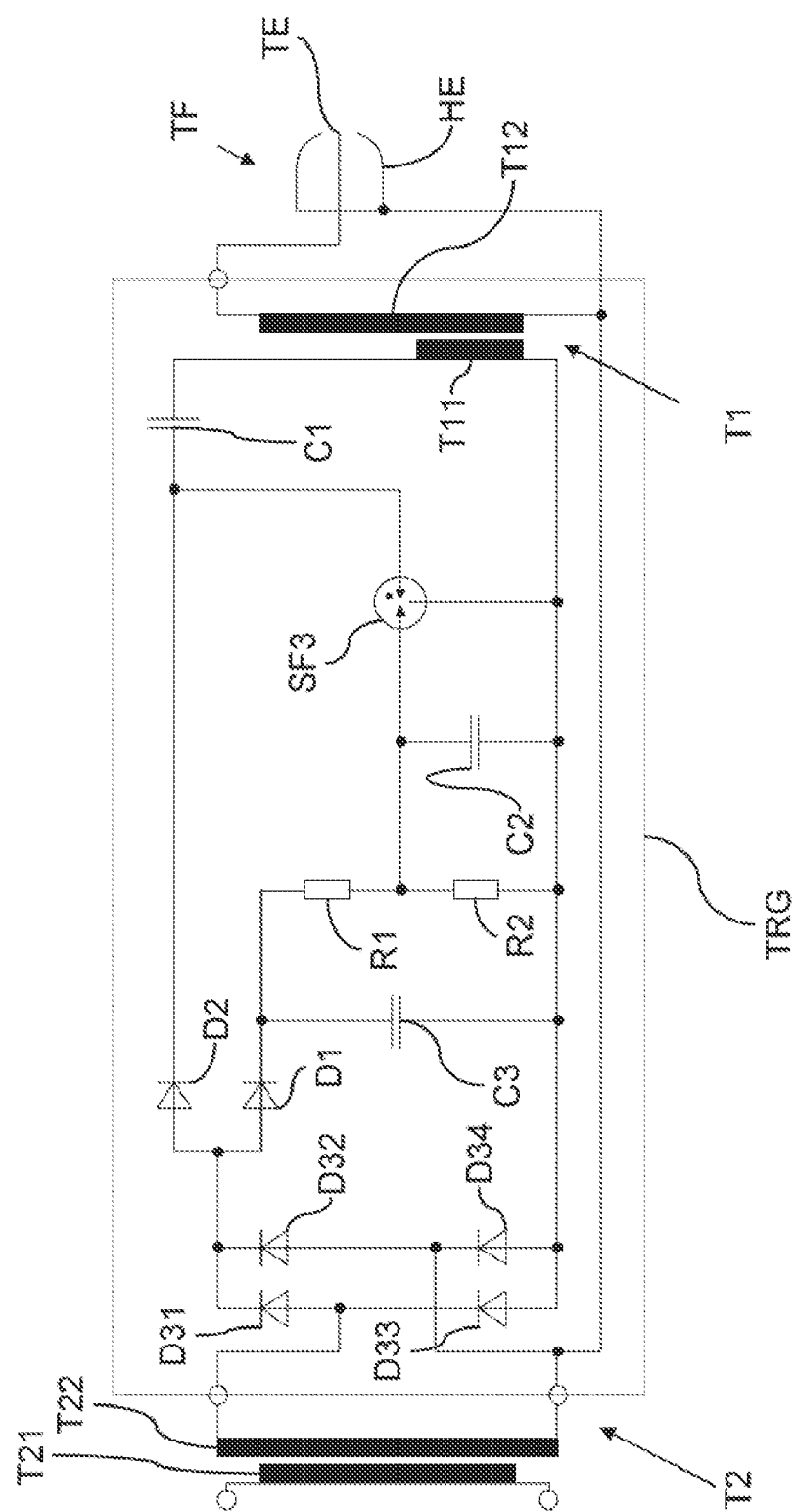

In the figures:

FIG. 1 shows a block circuit diagram of an embodiment of a spark gap arrangement having a triggerable spark gap and a trigger circuit, FIG. 2 shows a block circuit diagram of another embodiment of a spark gap arrangement having a triggerable spark gap and a trigger circuit, and FIG. 3 shows a block circuit diagram of another embodiment of a spark gap arrangement having a triggerable spark gap and a trigger circuit.

The block circuit diagrams of FIGS. 1-3 in each case illustrate a trigger circuit TRG, in which, on the left input side, a transformer T2 is connected to a primary winding T21 and a secondary winding T22, wherein the input connections of the trigger circuit TRG are connected to the secondary winding T22. On the output side, a triggerable spark gap TF, for example a gas-discharge spark gap or a gas-filled electrical surge arrester, having a main electrode HE and a trigger electrode TE is connected to the trigger circuit TRG. A further main electrode of the triggerable spark gap TF is not illustrated for reasons of clarity. The spark gap TF is connected to the secondary side T12 of a high-voltage transformer T1 which is comprised by the trigger circuit TRG. A primary winding T11 of the high-voltage transformer T1 is illustrated smaller than the corresponding secondary winding T12 in order to express that, preferably, a step-up transformation between primary side T11 and secondary side T12 of the transformer T1 is performed by the high-voltage transformer T1.

With reference to FIG. 1, a series circuit composed of a first diode D1 and a charge store C3 is connected in the trigger circuit TRG between the input connections of the trigger circuit TRG. Similarly, a series circuit composed of a second diode D2 and a charge store C4 is connected between the input connections. In each case, a node between the charge store C3, C4 and the diode D1, D2 is formed by the cathode of the respective diode. A third diode D3 is connected back-to-back with said two series circuits between the input connections, with the result that the cathode of the diode D3 is connected to the positive, upper input connection and the anode is connected to the lower, negative input connection. A first or, respectively, second resistor R1, R3 is connected to the node between the first or, respectively, second diode D1, D2 and the respective charge store C3, C4, said resistors connecting the respective node to in each case an anode of a fourth and a fifth diode D4, D5. The diodes D4, D5 are connected to one another on the cathode side and lead to a connection to a switching spark gap SF the other connection of which is connected to the negative input connection. A third resistor R2 and a charge store C2 are connected in parallel with one another between the node between the first resistor R1 and the fourth diode D4 and the negative input connection. Similarly, a charge store C1 is connected between the node between the diode D5 and the resistor R3 via the primary winding T11 of the transformer T1 to the negative input connection.

During operation of the spark gap arrangement, for example, a pulse is applied to the primary side T21 of the transformer T2, which pulse induces an input pulse on the secondary side T22. By way of example, said pulse has a single oscillation period with a positive and a negative half-cycle. The negative half-cycle is short-circuited via the diode D3 while the positive half-cycle leads, via the diodes D1, D2, to direct charging of the charge stores C3, C4, which are embodied as capacitors, for example. Once the input pulse has ended, the charge stores C3, C4 discharge via the resistors R1, R3 to the other charge stores C1, C2. If the charge voltage across the charge store C2 exceeds a switching voltage threshold of the switching spark gap SF, the latter is ignited via the diode D4 and represents a low-impedance connection in the ignited state. Accordingly, the charge store C1 is short-circuited or bypassed in a low-impedance manner, with the result that a voltage pulse is generated in the primary winding T11 of the high-voltage transformer T1, which voltage pulse, when stepped-up on the secondary side T12, leads to a high-voltage pulse at the triggerable spark gap TF, in particular between the trigger electrode TE and the illustrated main electrode HE.

Said voltage pulse then leads to triggering, or ignition, of the spark gap TF. The ignition of the spark gap TF by the trigger electrode TE ultimately causes the formation of a conductive channel between the illustrated main electrode HE and another main electrode—not illustrated—of the spark gap TF. By means of the time constant which results from a resistance value of the resistor R1 and a capacitance of the charge store C2 and by means of the predefined turn-on voltage of the switching spark gap SF, a predefined time interval between the appearance of an input pulse and the resulting ignition of the spark gap TF emerges. Accordingly, the illustrated spark gap arrangement can be provided for applications in which a particular delay between input pulse and turning-on of the spark gap TF is desired or necessary.

The functional principle, which has initially been described in general terms, of the spark gap arrangement will now be explained on the basis of an embodiment with component values which have been selected by way of example.

By way of example, the transformer T2 is dimensioned such that an input pulse can be generated with a pulse peak of greater than 2 kV. The diodes D1, D2, D3 are designed, for example, with a strength of approximately 10 kV. The charge store C3 is designed, for example, as a capacitor having a capacitance of 1 nF; the charge store C4 is designed as a capacitor having a capacitance of 10 nF. The first resistor R1 has a value of 47 kΩ while the second resistor R3 has a resistance value of 1 kΩ. The resistor R2 is dimensioned, for example, to be 470 kΩ. The charge store C2 is embodied by a capacitor having a capacitance of 1 nF, while the charge store C1 is designed as a capacitor with a capacitance of 47 nF.

In the case of an input pulse having a pulse peak of greater than 2 kV, the charge stores C3, C4 are directly charged via the diodes D1, D2 to a charge voltage of approximately 2 kV.

Owing to the larger capacitance of the charge store C4, a greater amount of charge is stored thereon. Once the input pulse has ended, the charges stored on the charge stores C3, C4 are transferred to the charge stores C1, C2. The charge store C1 is charged or recharged to a charge voltage of approximately 400 V via the resistor R3 which is smaller than the resistor R1. Said charge voltage is in particular below a turn-on voltage of the switching spark gap SF.

The charge stored on the charge store C3 is transferred via the first resistor R1 to the charge store C2, wherein the process of charging the charge store C2 is slower than the process of charging the charge store C1. However, owing to the lower capacitance value of the charge store C2, the latter can be charged to a higher charge voltage which, in particular, is higher than the turn-on voltage of the switching spark gap SF, at least in theory. If, in particular, the instantaneous charge voltage of the charge store C2 reaches said turn-on voltage of the switching spark gap SF, the latter ignites and forms a low-impedance arc gap which short-circuits the series circuit composed of the primary winding T11, the charge store C1 and the diode D5 or connects it in a low-impedance manner. By means of said low-impedance connection, a voltage the size of which corresponds to that of the charge voltage of the charge store C1 is induced in the primary winding T11 in a pulsed manner, which leads to a voltage pulse having a pulse peak of approximately 10 kV on the secondary side T12. Said pulse peak ultimately triggers the spark gap TF.

The charge store C2 is discharged via the resistor R2, which, in particular, has an effect if no input pulse is present. In a process of transferring charge from the first charge store C3, the discharge current through the resistor R2 is negligible, in particular owing to the significantly higher resistance value of the resistor R2. The possibility of discharging the charge store C2 prevents that any residual charges could be kept on the charge store C2, in order thus to reduce a time until triggering of the switching spark gap SF. Accordingly, the resistor R2 ensures that a defined time interval is maintained between an input pulse appearing and the output of an ignition pulse for the spark gap TF. Said time interval of, for example, 15 µs can be determined, inter alia, by the level of the switching voltage of the switching spark gap SF and the component values of the elements R1, C2.

FIG. 2 shows an alternative configuration of the spark gap arrangement, in which the design of the trigger circuit TRG in particular is different from the embodiment described in FIG. 1. The trigger circuit TRG in FIG. 2 comprises, on the input side, a full-wave rectifier with rectifier diodes D31, D32, D33, D34 which are interconnected as a bridge rectifier. At the positive output of the bridge rectifier, a first charge store C1 is connected, the second connection of which charge store is connected to the primary winding T11 of the transformer T1. Furthermore, a first resistor R1 is connected to the positive connection of the rectifier, said first resistor, in series with the resistor R2, likewise being connected to the negative connection of the rectifier. The second charge store C2 is furthermore connected between the resistor R1 and the negative connection of the rectifier. The trigger circuit TRG also comprises a thyristor TH which connects the positive and the negative rectifier connections or the first charge store C1 to the lower connection of the primary winding T11. A trigger connection of the thyristor TH is connected to the second charge store C2 via a trigger diode TD. The lower connection of the secondary winding T12 of the transformer T1 is connected to the lower connection of the secondary winding T22 of the transformer T2 to create a common reference potential.

During operation of the spark gap arrangement, a pulse is applied, for example, to the primary side T21 of the transformer T12, said pulse inducing an input pulse on the secondary side T22. In turn, said input pulse has, for example, only one oscillation period having a positive and a negative half-cycle, which, by means of the rectification with the rectifier diodes D31, D32, D33, D34, leads to direct charging of the charge store C1 which, for example, is embodied as a capacitor. Accordingly, the energy of the input pulse is at least partially intermediately stored on the first charge store C1. Once the input pulse has ended, the charge store C1 partially discharges via the resistor R1 to the charge store C2. If the charge voltage across the second charge store C2 exceeds a switching voltage threshold of the trigger diode TD, said trigger diode turns on and thus conducts the charge voltage at the second charge store C2 to the control connection of the thyristor TH.

The thyristor TH is accordingly triggered by the charge voltage of the second charge store C2, with the result that a low-impedance connection exists between the first charge store C1 and the lower connection of the primary winding T11. In other words, the first charge store C1 is short-circuited by means of the thyristor TH and the primary winding T11. As a result of this, a voltage pulse is generated in the primary winding T11 of the high-voltage transformer T1, which voltage pulse, stepped-up on the secondary side T12, leads to a high-voltage pulse at the triggerable spark gap TF, as also described above in the case of the exemplary embodiment in FIG. 1. Said voltage pulse then, in turn, leads to the spark gap TF being triggered or ignited.

By means of the time constant which results from a resistance value of the resistor R1 and a capacitance of the charge store C2, and by means of the switching voltage threshold of the thyristor TH or of the trigger diode TD, a predefined time interval between the appearance of an input pulse at the transformer T2 and the ignition of the spark gap TF resulting therefrom emerges in turn. Consequently, the illustrated spark gap arrangement can again be provided for applications in which a particular delay between input pulse and turning-on of the spark gap TF is necessary or desired. Similarly to the above-described embodiment in FIG. 1, the resistor R2 also serves here to discharge the charge store C2, which prevents that any residual charges could be retained on the second charge store C2 in order thus to reduce a time until the short-circuiting of the charge store C1. Accordingly, it is ensured by means of the resistor R2 that a defined time interval between the appearance of an input pulse and the output of an ignition pulse for the spark gap TF is adhered to, which time interval is 15 µs, for example.

By way of example, the first charge store C1 has a capacitance of 470 nF, while the second charge store C2 has a capacitance of 5 nF. The first resistor R1 is dimensioned to be, for example, 22 kΩ. The dimensional ratio between the first and second charge stores C1, C2 is in the present case therefore approximately the factor 100. Hence it is ensured that, in the event of a transfer of energy from the first charge store C1 to the second charge store C2 via the resistor R1, only a small portion of the energy which is intermediately stored from the input pulse is transferred to the second charge store C2. However, said energy is sufficient, owing to the lower capacitance of the second charge store C2, to reach the switching voltage necessary for the triggering of the thyristor TH. Moreover, a sufficient amount of charge or voltage remains on the first charge store C1 in order to generate a sufficient voltage pulse in the high-voltage transformer T1 in the event of a short circuit via the thyristor TH. In contrast to the embodiment illustrated in FIG. 1, the first charge store C1 in the embodiment in FIG. 2 is used both to store the energy which is necessary for implementing the time delay resulting from the transfer of charge and to store the ignition energy for the high-voltage transformer T1.

FIG. 3 shows another alternative embodiment of a spark gap arrangement which forms a modification to the embodiment illustrated in FIG. 2. Again, a rectifier bridge having rectifier diodes D31, D32, D33, D34 is provided at the input of the trigger circuit TRG. In addition to the first charge store C1, which is connected to the positive output of the rectifier via a diode D2, a further charge store C3 is provided, which is connected to the positive connection of the rectifier bridge via a diode D1. The resistor R1 is connected to a connection node of the diode D1 and of the charge store C3, wherein a second connection of the resistor R1 is connected to the negative connection of the rectifier via a parallel circuit composed of the resistor R2 and the second charge store C2.

The trigger circuit TRG additionally comprises a three-electrode arrester SF3 the first outer electrode of which is connected to the connection node of the resistors R1, R2 or the connection node of the resistor R1 and the second charge store C2, the second outer electrode of said three-electrode arrester being connected to the connection node of the diode D2 and the first charge store C1, and the central electrode of said three-electrode arrester being connected to the negative connection of the rectifier or to the lower connection of the primary winding T11 of the high-voltage transformer T1.

During operation of the arrangement, an input pulse present at the transformer T2 is again rectified and used to directly charge the charge stores C1, C3 via the diodes D1, D2 connected in the forward direction. The transfer of charge between the charge stores C1, C3 is prevented by the polarity of the diodes D1, D2. The energy of the input pulse is thus intermediately stored both on the first charge store C1 and on the third charge store C3. Once the input pulse has ended, charge from the third charge store C3 is at least partially transferred to the second charge store C2 via the resistor R1, with the result that the charge voltage of said second charge store increases in accordance with the time constant resulting from the resistance or capacitance value.

When an appropriate switching voltage of the three-electrode arrester SF3 between the corresponding outer electrode and the central electrode is reached, the three-electrode arrester SF3 is caused to ignite, with the result that the arc gap between the central electrode and the other outer electrode, which is connected to the charge store C1, also becomes low-impedance. Consequently, the charge store C1 is short-circuited and discharged via the three-electrode arrester SF3 and the primary winding T11 of the high-voltage transformer T1, with the result that a high-voltage pulse is again induced on the secondary side T12, which pulse leads to the ignition of the triggerable spark gap TF. The function of the resistor R2 corresponds to the preceding exemplary embodiments.

In this embodiment, the first charge store C1 has, for example, a capacitance of 470 nF, while the second and the third charge stores C2, C3 have in each case a capacitance of 1 nF. The first resistor R1 is dimensioned to be, for example, 47 kΩ. The voltage ratios and, in particular, the orders of magnitude of the voltages correspond to those in the exemplary embodiment in FIG. 1.

As in the case of the above-described exemplary embodiments, a delayed triggering of the spark gap TF is achieved by means of the intermediate storage of the energy of the input pulse, in this case on the charge store C3, and the transfer of charge to the second charge store C2 via a resistor R1.

In various embodiments, in the case of the above-described exemplary embodiments in FIGS. 1 to 3, a diode can be connected in parallel with the primary winding T11 of the high-voltage transformer T1. In particular, an anode of said diode is connected to the upper connection of the primary winding T11 or to the first charge store C1, while the cathode is connected to the lower connection of the primary winding T11. As a result, for example, it is prevented that, in the event of steep input pulses at the transformer T2 owing to the charging of the first charge store C1, a pulse with opposite polarity is induced in the high-voltage transformer T1. In the case of the intended discharge of the first charge store C1, the additional diode is then in the blocking direction, with the result that the above-described behavior ensues.

The triggerable spark gap of the described embodiments is embodied, for example, with electrodes in a ceramic housing, which is filled with gas, in particular between the main electrodes. However, other embodiments of conventional triggerable spark gaps can also be used. Preferably, the trigger circuit is integrated in a housing of the triggerable spark gap, with the result that, in particular, direct contact cannot be made with a connection of the trigger electrode TE from outside the housing; rather, for example, contact can only be made with the input connections of the trigger circuit TRG or the transformer T2 provided on the input side and the main electrodes from outside the housing.

A spark gap arrangement according to any of the described exemplary embodiments can be used, for example, in medical devices which require high voltages to be turned on. By way of example, a spark gap arrangement such as this is used in a lithotripsy device.

The invention claimed is:

1. A spark gap arrangement having a triggerable spark gap (TF) and a trigger circuit (TRG), which comprises a first and a second charge store (C1, C2), a first resistor (R1), a triggerable dissipation element (SF, SF3, TD, TH) and a transformer (T1), the trigger circuit (TRG) being set up
    to intermediately store the energy of an input pulse supplied to the input side of the trigger circuit (TRG), wherein storage takes place at least by means of the first charge store (C1); and
    to transfer a part of the stored energy to the second charge store (C2) via the first resistor (R1);
    wherein the triggerable dissipation element (SF, SF3, TD, TH) is set up to turn on on the basis of a voltage across the second charge store (C2) and to discharge the first charge store (C1) via a primary side (T11) of the transformer (T1); and
    wherein a secondary side (T12) of the transformer (T1) is connected to a main electrode (HE) of the triggerable spark gap (TF) and to a trigger electrode (TE) of the triggerable spark gap (TF).

2. The spark gap arrangement according to claim 1,
    in which the storage of the energy of the input pulse takes place exclusively by means of the first charge store (C1), wherein the trigger circuit (TRG) is set up to partially discharge the first charge store (C1) via the first resistor (R1) in order to charge the second charge store (C2).

3. The spark gap arrangement according to claim 2,
    in which the triggerable dissipation element (TD, TH) comprises a trigger diode (TD) and a thyristor (TH), wherein the trigger diode (TD) is set up to switch the thyristor (TH) so as to conduct on the basis of the voltage across the second charge store (C2).

4. The spark gap arrangement according to claim 1, in which the trigger circuit (TRG) also comprises a third charge store (C3), wherein the storage of the energy of the input pulse takes place via the first charge store (C1) and the third charge store (C3), and wherein the trigger circuit (TRG) is set up to discharge the third charge store (C3) via the first resistor (R1) in order to charge the second charge store (C2).

5. The spark gap arrangement according to claim 4, in which the trigger circuit (TRG) is set up to charge the first charge store (C1) and the third charge store (C3) directly by means of the input pulse.

6. The spark gap arrangement according to claim 5, in which the triggerable dissipation element (SF3) comprises a three-electrode arrester (SF3), in which a central electrode is set up to turn on the three-electrode arrester (SF3) on the basis of the voltage across the second charge store (C2).

7. The spark gap arrangement according to claim 4, in which the trigger circuit (TRG) also comprises a fourth charge store (C4) and a second resistor (R3), wherein the trigger circuit (TRG) is set up to charge the third and the fourth charge stores (C3, C4) directly by means of the input pulse, and to discharge the fourth charge store (C4) via the second resistor (R3) in order to charge the first charge store (C1).

8. The spark gap arrangement according to claim 7, in which the triggerable dissipation element (SF) comprises a switching spark gap (SF) which is set up to turn on on the basis of the voltage across the second charge store (C2).

9. The spark gap arrangement according to any of claims 1 to 8, in which the trigger circuit (TRG) has a rectifier circuit (D3, D31, D32, D33, D34) which is set up to enable the storage of the energy of the input pulse on the basis of a positive half-cycle and/or a negative half-cycle of the input pulse.

10. The spark gap arrangement according to any of claims 1 to 9, in which a further resistor (R2) is connected in parallel with the second charge store (C2).

11. The spark gap arrangement according to any of claims 1 to 10, in which the trigger circuit (TRG) is integrated into a housing of the triggerable spark gap (TF).

12. The spark gap arrangement according to any of claims 1 to 11, in which the transformer (T1) is embodied as a high-voltage transformer.

13. The spark gap arrangement according to any of claims 1 to 12, also comprising a further transformer (T2) which is set up to generate the input pulse from a pulse present at a primary side of the further transformer (T2).

14. The spark gap arrangement according to any of claims 1 to 13, in which the triggerable spark gap (TF) is a gas-discharge spark gap or a gas-filled electrical surge arrester.

15. The spark gap arrangement according to any of claims 1 to 14, in which the trigger circuit (TRG) is dimensioned such that a time interval between the appearance of the input pulse and the turning-on of the triggerable dissipation element (SF, SF3, TD, TH) is always greater than a predefined value, in particular is greater than 15 μs.

* * * * *